(12) United States Patent
Alford

(10) Patent No.: US 7,776,422 B2
(45) Date of Patent: Aug. 17, 2010

(54) FLOOR MAT HAVING A RETENTION FEATURE

(75) Inventor: William G. Alford, Canton, OH (US)

(73) Assignee: International Automotive Components Group North America, Inc., Dearborn, MI (US)

(*) Notice: Subject to any disclaimer, the term of this patent is extended or adjusted under 35 U.S.C. 154(b) by 405 days.

(21) Appl. No.: 11/972,963

(22) Filed: Jan. 11, 2008

(65) Prior Publication Data
US 2008/0213537 A1 Sep. 4, 2008

Related U.S. Application Data

(60) Provisional application No. 60/884,484, filed on Jan. 11, 2007.

(51) Int. Cl.
B32B 3/00 (2006.01)

(52) U.S. Cl. .................................. 428/99; 428/120
(58) Field of Classification Search ................ 428/99, 428/120, 88, 95
See application file for complete search history.

(56) References Cited

U.S. PATENT DOCUMENTS

| 4,230,755 | A | | 10/1980 | Morris | |
|---|---|---|---|---|---|
| 4,721,641 | A | | 1/1988 | Bailey | |
| 4,829,627 | A | | 5/1989 | Altus et al. | |
| 5,258,217 | A | * | 11/1993 | Lewis | ............ 428/120 |
| 7,029,743 | B2 | * | 4/2006 | Robbins, III | ........... 428/120 |

* cited by examiner

Primary Examiner—Alexander Thomas
(74) Attorney, Agent, or Firm—Brooks Kushman P.C.

(57) ABSTRACT

A floor mat having a first surface, a second surface disposed opposite the first surface; and a V-shaped retention feature. The V-shaped retention feature extends from the second surface and has first and second ramp surfaces disposed at an angle relative to the second surface.

17 Claims, 2 Drawing Sheets

US 7,776,422 B2

FLOOR MAT HAVING A RETENTION FEATURE

CROSS-REFERENCE TO RELATED APPLICATIONS

This application claims the benefit of U.S. provisional application Ser. No. 60/884,484 filed Jan. 11, 2007.

BACKGROUND OF THE INVENTION

Field of the Invention

The present invention relates to a floor mat.

SUMMARY OF THE INVENTION

In at least one embodiment of the present invention, a floor mat is provided. The floor mat has a first surface, a second surface disposed opposite the first surface, and a V-shaped retention feature. The V-shaped retention feature extends from the second surface and has first and second ramp surfaces disposed at an angle relative to the second surface.

In at least one embodiment of the present invention, a floor mat is provided. The floor mat has a first surface, a second surface disposed opposite the first surface and first and second V-shaped retention features. The first and second V-shaped retention features are disposed opposite each other and extend from the second surface.

In at least one embodiment of the present invention, a floor mat is provided. The floor mat has a first surface, a second surface disposed opposite the first surface, a first V-shaped retention feature, and a second V-shaped retention feature. The first and second V-shaped retention features have openings that face toward each other. The first V-shaped retention feature has intersecting first and second ribs that extend from the second surface. The second V-shaped retention feature has intersecting third and fourth ribs that extend from the second surface. The first and second ribs have first and second ramp surfaces disposed in a non-parallel relationship with the second surface. The third and fourth ribs have third and fourth ramp surfaces are disposed in a non-parallel relationship with the second surface.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
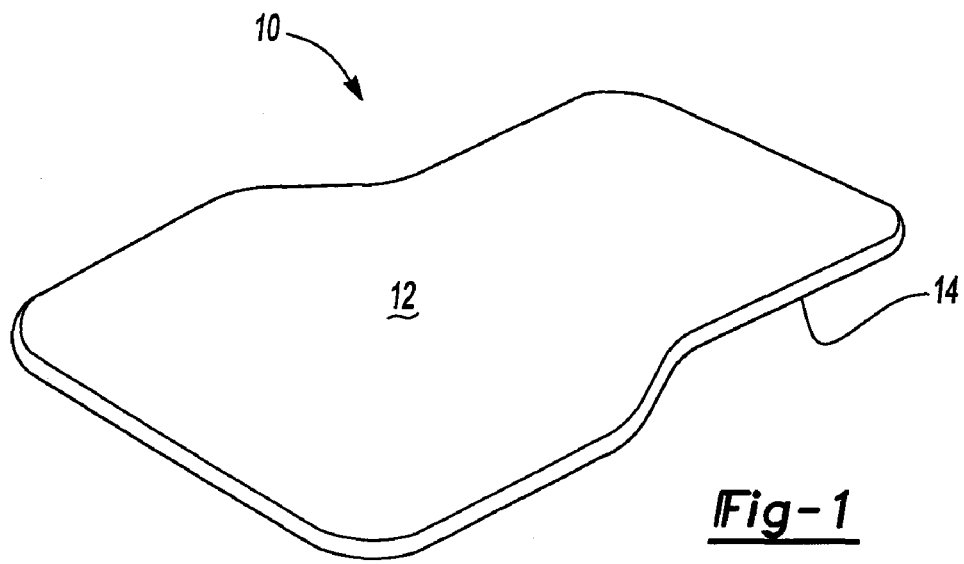
FIG. 1 is a perspective view of a floor mat.

Referring to FIG. 1, and exemplary floor mat 10 in accordance with the present invention is shown. The floor mat 10 may be provided for use with a vehicle, such as a car or truck. For example, the floor mat 10 may be designed to fit and at least partially conceal a vehicle floor.

The floor mat 10 may have any suitable configuration. For example, the floor mat 10 may include a top or first surface 12 and a bottom or second surface 14 disposed opposite the first surface 12.

The floor mat 10 may have one or more layers. If a single layer is provided, the first and second surfaces 12,14 may be disposed on opposite sides of the single layer. In a multi-layer construction, the first and second surfaces 12, 14 may be provided on different layers.

As an example of a multi-layer construction, the floor mat 10 may include a first layer and a second layer. The first layer may be provided as a top layer of the floor mat 10 and may be made of any suitable material or materials. For example, the first layer may be at least partially made of a flexible material, such as carpet or a polymeric material. The second layer may be made of any suitable material or materials, such as a polymeric or rubber material. In at least one embodiment, the second layer may be provided on the first layer in any suitable manner, such as with a molding process like compression molding or using an adhesive. Alternatively, one or more intermediate layers, such as a foam insert, may be disposed between the first and second layers.

Figure 2:
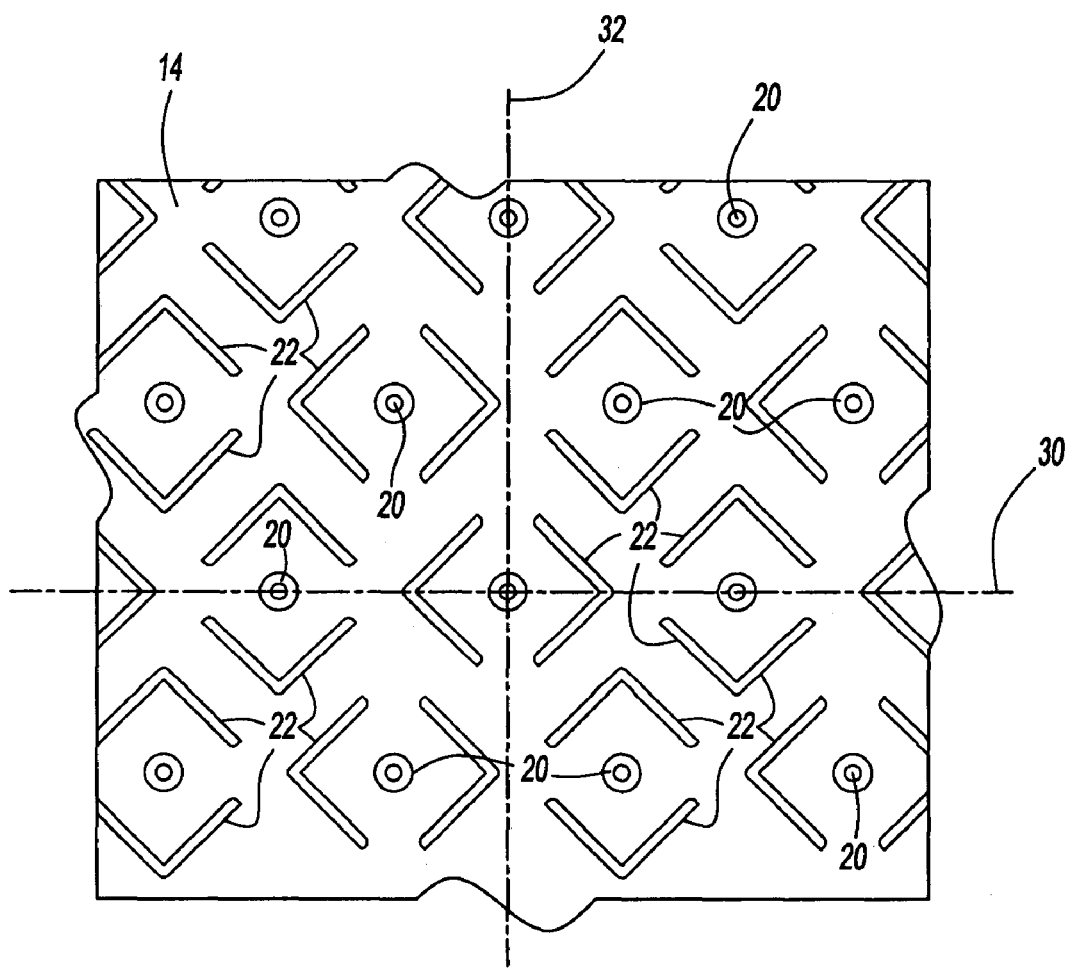
FIG. 2 is a plan view of a portion of a back side of the floor mat in accordance with one embodiment of the present invention.

Referring to FIG. 2, a portion of an exemplary second surface 14 is shown in more detail. The second surface 14 may include one or more retention features that help the floor mat 10 resist movement. The retention features may extend from the second surface 14 and may be configured to engage a vehicle surface, such as vehicle carpeting, to resist movement in one or more directions. In the embodiment shown, a plurality of nibs or protrusions 20 and V-shaped retention features 22 are provided. In the embodiments discussed below, the shape of the retention features and their orientations may help the floor mat 10 resist movement in multiple directions to provide superior passive retention of the floor mat 10.

Figure 4:
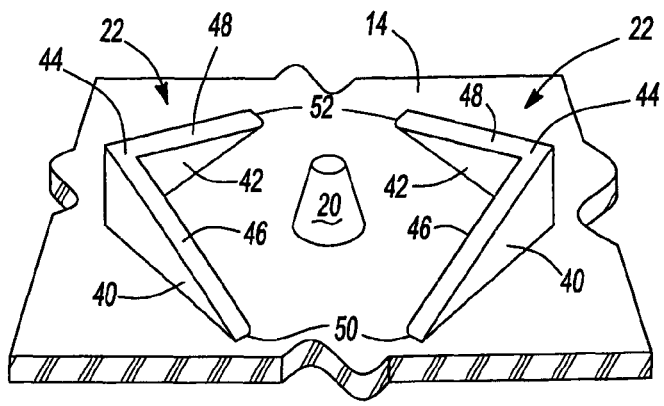
FIG. 4 is a perspective view of retention features in accordance with an embodiment of the present invention.

The protrusions 20 may have any suitable configuration. For example, the protrusions 20 may have a truncated conical shape as is best shown in FIG. 4. Alternatively, the protrusions 20 may have a generally cylindrical configuration or any other suitable cross section or shape that resists separation from the floor mat 10. In addition, the protrusions 20 may extend from the floor mat 10 by a predetermined distance to provide a desired amount of surface area for contact with a vehicle surface. For example, the protrusions may extend approximately 2-6 mm from the second surface 14 in one or more embodiments of the present invention. A length of approximately 4.0 mm may be well suited for engagement with vehicle carpeting. The protrusions 20 may be integrally formed with the floor mat 10 in any suitable manner, such as by molding, or may be provided as a separate component that is bonded or attached to the floor mat 10.

The V-shaped retention features 22 may also be provided on the floor mat 10 in any suitable manner. For example, the V-shaped retention features 22 may be integrally formed with the floor mat 10, such as by molding, or may be provided as a separate component that is bonded or attached to the floor mat 10.

The protrusions 20 and/or one or more V-shaped retention features 22 may be positioned in a defined arrangement on the second surface 14. In FIG. 2, pairs of V-shaped retention features 22 are generally disposed around a protrusion 20.

The protrusions 20 may be arranged in a repeating pattern. In the embodiment shown in FIG. 2, each protrusion 20 is positioned in a grid pattern, such as where a horizontal axis intersects a vertical axis. Optionally, one or more protrusions 20 may be omitted and/or arranged in patterns that differ from that shown in FIG. 2.

Figure 3:
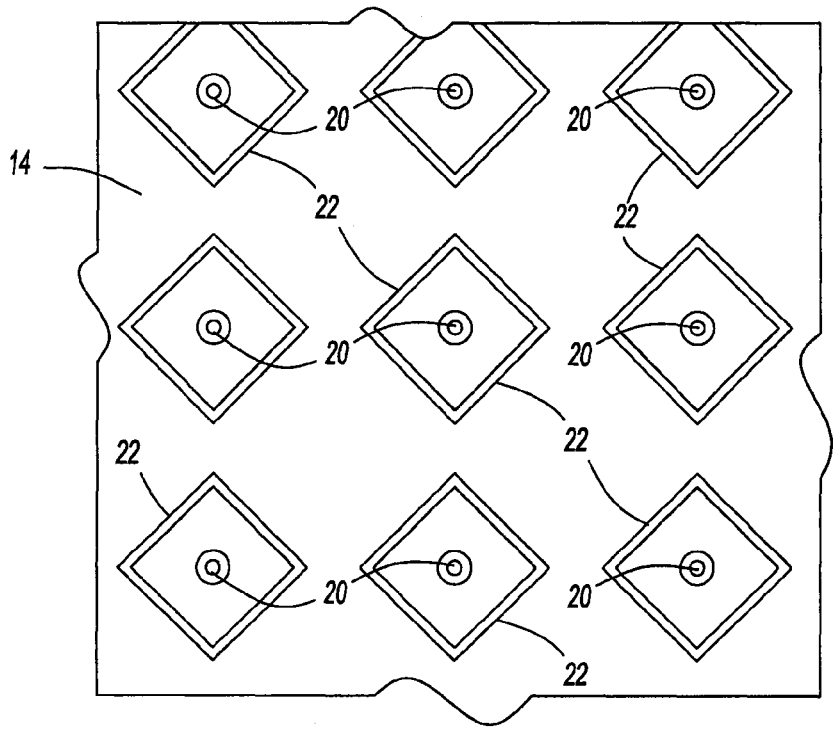
FIG. 3 is a plan view of a portion of a back side of the floor mat in accordance with another embodiment of the present invention.

The V-shaped retention features 22 may be spaced apart from and may generally be centered about a protrusion 20. In addition, the V-shaped retention features 22 that make up a pair may be spaced apart from each other as shown in FIG. 2. Alternatively, the V-shaped retention features 22 that make up a pair may contact or extend from each other. Such an arrangement may result in a square or diamond arrangement as shown in FIG. 3.

V-shaped retention features 22 may be arranged with different orientations to inhibit movement of the floor mat 10 in multiple directions. Moreover, the orientation of one or more the V-shaped retention features 22 may vary in a repeating pattern in one or more directions. In FIG. 2, pairs of V-shaped retention features 22 are generally arranged in rows and columns. Pairs of V-shaped retention features 22 may vary between a first orientation in which the vertices of a pair of V-shaped retention features 22 are oriented along a first axis 30 (shown extending in a horizontal direction) and a second orientation in which the vertices of a pair V-shaped retention features 22 are oriented along a second axis 32 (shown extending in a vertical direction). The first and second axes 30,32 may be arranged perpendicular to each other as shown in FIG. 2 or at a greater or lesser angle in one or more embodiments of the present invention.

Pairs of V-shaped retention features 22 may alternate between two orientations along a row or column. Alternatively, the V-shaped retention features 22 may be arranged in different patterns than that shown in FIG. 2. For instance, V-shaped retention features 22 may all be arranged in the same direction along one or more axes. In addition, the V-shaped retention features 22 may be provided in more than two orientations along an axis in one or more embodiments of the present invention. For instance, one or more V-shaped retention features 22 may be rotated by 45 degrees from a neighboring retention feature(s), or by any other suitable angle.

Referring to FIG. 4, an enlarged perspective view of a protrusion 20 and a pair of V-shaped retention features 22 are shown. In this embodiment, the V-shaped retention features 22 are shown spaced apart from each other, but may be reconfigured to contact or extend from each other in accordance with FIG. 3.

Each V-shaped retention feature 22 may include a first rib 40 and a second rib 42. The first and second ribs 40,42 may intersect at a vertex or apex 44. The first and second ribs 40,42 may be oriented at any suitable angle relative to each other. In the embodiment shown in FIG. 4, the first and second ribs 40,42 are oriented substantially perpendicular to each other.

The first and second ribs 40,42 may have first and second ramp surfaces 46,48, respectively. The first and second ramp surfaces 46,48 may extend at an angle relative to the second surface 14. In the embodiment shown in FIG. 4, the first and second ribs 40,42 are generally triangular when viewed from the side. Moreover, in the embodiment shown in FIG. 4 the first and second ramp surfaces 46,48 are shown as being generally planar. Alternatively, the first and/or second ramp surfaces 46,48 may have a non-planar configuration to help provide increased surface area to help the floor mat 10 resist movement. For example, the ramp surfaces 46,48 may be corrugated, textured, ribbed, and/or curved in one or more embodiments of the present invention.

The first and second ramp surfaces 46,48 may extend from distal ends 50,52 of the first and second ribs 40,42, respectively, to the apex 44. As such, the apex 44 may be spaced further from the second surface 14 than the distal ends 50,52. The apex 44 may extend from the second surface 14 by approximately the same amount as one or more protrusions 22 in at least one embodiment of the present invention. In addition, the first and second ribs 40,42 may be extended or repositioned such that the distal ends 50,52 contact each other to provide the arrangement shown in FIG. 3.

Figure 5:
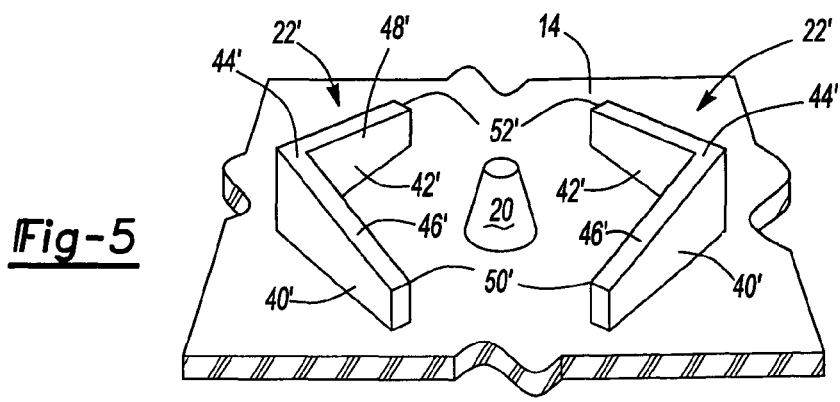
FIG. 5 is a perspective view of retention features in accordance with another embodiment of the present invention.

Referring to FIG. 5, another embodiment of a V-shaped rib feature 22' is shown. In this embodiment, first and second ribs 40',42' intersect at a vertex or apex 44' and have first and second ramp surfaces 46',48' as previously discussed. In this embodiment, the distal ends 50',52' of the first and second ribs 40',42' are spaced apart from the second surface 14. As such, this embodiment provides additional surface area and vertical edges that provide enhanced grip as compared to the embodiment shown in FIG. 4. Similar to the embodiment shown in FIG. 4, the first and second ribs 40',42' may be extended or repositioned such that the distal ends 50',52' contact each other to provide the arrangement shown in FIG. 3.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A floor mat comprising:
    a first surface;
    a second surface disposed opposite the first surface; and
    a V-shaped retention feature extending from the second surface, the V shaped retention feature having first and second ramp surfaces disposed at an angle relative to the second surface.

2. The floor mat of claim 1 wherein the first and second ramp surfaces intersect at an apex.

3. The floor mat of claim 2 wherein the apex is spaced further from the second surface than distal ends the first and second ramp surfaces.

4. The floor mat of claim 3 wherein the distal ends of the first and second ramp surfaces intersect the second surface.

5. The floor mat of claim 1 wherein the first and second ramp surfaces are completely spaced apart from the second surface.

6. The floor mat of claim 1 further comprising a protrusion spaced apart from the V-shaped retention feature.

7. A floor mat comprising:
    a first surface;
    a second surface disposed opposite the first surface;
    a first set of retention features including first and second V-shaped retention features that are disposed opposite each other and extend from the second surface; and
    a second set of retention features including third and fourth V-shaped retention features, wherein the first set is spaced apart from the second set,
    the first and second V-shaped retention features having first and second apexes, respectively, arranged along a first axis and the third and fourth V-shaped retention features having third and fourth apexes, respectively, arranged along a second axis, wherein the first axis does not intersect the third and fourth apexes, the first and second V-shaped retention features each having a pair of ramp surfaces that extend away from the second surface and intersect at the first and second apexes, respectively.

8. The floor mat of claim 7 wherein the first axis is perpendicular to the second axis.

9. The floor mat of claim 7 further comprising a first protrusion extending from the second surface and disposed on the first axis and spaced apart from first and second apexes.

10. The floor mat of claim 9 wherein the first protrusion is substantially centered between the first apex and the second apex.

11. The floor mat of claim 7 further comprising a second protrusion extending from the second surface and disposed on the first axis.

12. The floor mat of claim 7 wherein the first and second apexes are spaced apart from the second axis.

13. A floor mat comprising:

a first surface;

a second surface disposed opposite the first surface;

a first V-shaped retention feature having first and second ribs that extend from the second surface and intersect each other, the first and second ribs having first and second ramp surfaces, respectively, disposed in a non-parallel relationship with the second surface; and a second V-shaped retention feature having third and fourth ribs that extend from the second surface and intersect each other, the third and fourth ribs having third and fourth ramp surfaces, respectively, disposed in a non-parallel relationship with the second surface;

wherein the first and second V-shaped retention features each have openings that face toward each other.

14. The floor mat of claim 13 wherein the first and second ramp surfaces are coplanar.

15. The floor mat of claim 13 wherein the first V-shaped retention feature is spaced apart from the second V-shaped retention feature.

16. The floor mat of claim 13 wherein the first V-shaped retention feature contacts the second V-shaped retention feature.

17. The floor mat of claim 13 wherein the first and second V-shaped retention features are centered about and spaced apart from a protrusion that extends from the second surface.

* * * * *